United States Patent
Coomans et al.

(10) Patent No.: US 11,489,654 B2
(45) Date of Patent: Nov. 1, 2022

(54) APPARATUS AND METHOD FOR FULL-DUPLEX COMMUNICATION OVER A SHARED TRANSMISSION MEDIUM

(71) Applicant: Alcatel Lucent, Boulogne-Billancourt (FR)

(72) Inventors: Werner Coomans, Antwerp (BE); Hungkei Chow, Murray Hill, NJ (US)

(73) Assignee: VECIMA NETWORKS INC., Victoria (CA)

(*) Notice: Subject to any disclaimer, the term of this patent is extended or adjusted under 35 U.S.C. 154(b) by 729 days.

(21) Appl. No.: 15/516,521

(22) PCT Filed: Oct. 22, 2015

(86) PCT No.: PCT/EP2015/074441
§ 371 (c)(1),
(2) Date: Apr. 3, 2017

(87) PCT Pub. No.: WO2016/066513
PCT Pub. Date: May 6, 2016

(65) Prior Publication Data
US 2018/0234228 A1    Aug. 16, 2018

(30) Foreign Application Priority Data

Oct. 28, 2014  (EP) .................................... 14306714

(51) Int. Cl.
*H04L 5/14* (2006.01)
*H04W 16/14* (2009.01)
*H04L 5/00* (2006.01)

(52) U.S. Cl.
CPC ............... *H04L 5/14* (2013.01); *H04W 16/14* (2013.01); *H04L 5/0091* (2013.01)

(58) Field of Classification Search
CPC ....... H04L 5/14; H04L 5/0001; H04L 5/0091; H04L 5/0092; H04W 16/14
See application file for complete search history.

(56) References Cited

U.S. PATENT DOCUMENTS

| 6,563,806 B1* | 5/2003 | Yano | H04W 72/042 370/330 |
| 8,238,367 B1* | 8/2012 | Choi | H04L 5/0007 370/235 |

(Continued)

FOREIGN PATENT DOCUMENTS

| CN | 101141235 A | 3/2008 |
| CN | 103081446 A | 5/2013 |

(Continued)

OTHER PUBLICATIONS

ITU-T J.222.1 Third-generation transmission systems for interactive cable television services—IP cable modems: Physical layer specification, Apr. 24, 2008 (Apr. 24, 2008), pp. 1-184, XP055176506, Retrieved from the Internet <URL:http://www.itu.int/rec/T-REC-J.222.1-200707-I/en> [retrieved on Mar. 13, 2015].

(Continued)

*Primary Examiner* — Hoang-Chuong Q Vu
(74) *Attorney, Agent, or Firm* — Harness, Dickey & Pierce, P.L.C.

(57) ABSTRACT

The communication device includes a transmitter for transmitting communication signals through a transmitter output terminal, a receiver for receiving communication signals through a receiver input terminal, and a coupling unit for coupling the transmitter output terminal and the receiver input terminal to the shared transmission medium, and including a first filter for passing communication signals from/to the shared transmission medium within a first communication frequency range, and a second filter for passing communication signals from/to the shared transmission (Continued)

medium within a second communication frequency range disjoint from the first communication frequency range.

4 Claims, 3 Drawing Sheets

(56) References Cited

U.S. PATENT DOCUMENTS

| | | | | |
|---|---|---|---|---|
| 8,310,961 | B2* | 11/2012 | Chindapol | H04W 76/45 370/277 |
| 8,542,617 | B2 | 9/2013 | Choi et al. | |
| 8,913,532 | B1* | 12/2014 | Fang | H04L 27/2666 370/294 |
| 9,516,633 | B2* | 12/2016 | Mcnamara | H04L 5/0044 |
| 10,348,394 | B1* | 7/2019 | Bakr | H04L 12/2854 |
| 2005/0030910 | A1 | 2/2005 | Robertson et al. | |
| 2007/0264935 | A1 | 11/2007 | Mohebbi | |
| 2008/0080406 | A1* | 4/2008 | Peplinski | H04B 7/2643 370/294 |
| 2008/0268779 | A1* | 10/2008 | Rajpal | H04W 8/005 455/41.2 |
| 2009/0092066 | A1* | 4/2009 | Chindapol | H04W 76/45 370/277 |
| 2009/0185511 | A1 | 7/2009 | Lee et al. | |
| 2009/0213766 | A1* | 8/2009 | Chindapol | H04B 7/2621 370/278 |
| 2009/0268645 | A1* | 10/2009 | Chindapol | H04L 5/0007 370/281 |
| 2009/0325578 | A1* | 12/2009 | Li | H04W 36/0055 455/436 |
| 2010/0008326 | A1* | 1/2010 | Albanese | H04W 72/005 370/331 |
| 2010/0195546 | A1* | 8/2010 | Chun | H04W 72/121 370/281 |
| 2010/0290374 | A1* | 11/2010 | Chin | H04W 36/08 370/281 |
| 2011/0014938 | A1* | 1/2011 | Shekalim | H04L 5/0037 455/509 |
| 2011/0026627 | A1* | 2/2011 | Chun | H04L 5/0007 375/260 |
| 2011/0075593 | A1 | 3/2011 | Chen et al. | |
| 2011/0261730 | A1* | 10/2011 | Moon | H04L 27/2626 370/280 |
| 2013/0039203 | A1* | 2/2013 | Fong | H04B 7/024 370/252 |
| 2013/0077551 | A1* | 3/2013 | Lo | H04W 16/14 370/312 |
| 2013/0190024 | A1* | 7/2013 | Hayase | H04B 15/00 455/501 |
| 2014/0064233 | A1* | 3/2014 | Oizumi | H04W 72/0446 370/329 |
| 2014/0141787 | A1* | 5/2014 | Marque-Pucheu | H04W 72/005 455/447 |
| 2014/0348040 | A1* | 11/2014 | Hong | H04L 5/0007 370/280 |
| 2015/0045076 | A1* | 2/2015 | Pan | H04W 16/10 455/501 |
| 2015/0049624 | A1* | 2/2015 | Sun | H04W 72/082 370/252 |
| 2015/0085805 | A1* | 3/2015 | Li | H04W 72/121 370/329 |
| 2015/0312905 | A1* | 10/2015 | Seo | H04B 7/2656 370/280 |
| 2016/0249338 | A1* | 8/2016 | Hwang | H04L 1/1861 |
| 2016/0286541 | A1* | 9/2016 | Webb | H04L 5/0037 |
| 2016/0308590 | A1* | 10/2016 | Wang | H04L 25/03343 |

FOREIGN PATENT DOCUMENTS

| | | |
|---|---|---|
| CN | 103248594 A | 8/2013 |
| CN | 203289416 U | 11/2013 |
| WO | WO-2007130488 A1 | 11/2007 |

OTHER PUBLICATIONS

International Search Report PCT/ISA/210 for International Application No. PCT/EP2015/074441 dated Jan. 20, 2016.
Written Opinion of the International Searching Authority PCT/ISA/237 for International Application No. PCT/EP2015/074441 dated Jan. 20, 2016.
Office Action for Chinese Patent Application No. 201580057093.4 dated Sep. 2, 2019.

* cited by examiner

APPARATUS AND METHOD FOR FULL-DUPLEX COMMUNICATION OVER A SHARED TRANSMISSION MEDIUM

CROSS-REFERENCE TO RELATED APPLICATIONS

This application is a national phase under 35 U.S.C. § 371 of PCT International Application No. PCT/EP2015/074441 which has an International filing date of Oct. 22, 2015, which claims priority to European Application No. 14306714.8, filed Oct. 28, 2014, the entire contents of each of which are hereby incorporated by reference.

TECHNICAL FIELD OF THE INVENTION

The present invention relates to full-duplex communication over a shared transmission medium, such as a cable plant.

TECHNICAL BACKGROUND OF THE INVENTION

The DSL paradigm, inc. Orthogonal Frequency Division Multiplexing (OFDM) and Discrete Multi-Tone (DMT) techniques, which has proven to be particularly successful for achieving very high data rates over bandwidth-limited copper plants, is now considered for higher-quality transmission media, such as coaxial cables.

A coaxial cable plant is a shared Point to Multi-Point (P2MP) medium connecting an access node to a plurality of subscriber terminals via coaxial segments coupled to each other by means of taps, power splitters combiners, couplers and the likes.

Full-duplex communication is envisioned as a way to make the most optimal use of the cable plant. Although terminals are still assigned non-overlapping sets of frequency carriers, the carriers can now be used for both downstream and upstream communications (not necessarily for the same subscriber terminal), yielding a doubling of the data throughput compared to half-duplex techniques as envisioned for G.Fast, or Frequency Division Duplexing (FDD) techniques as used in xDSL or DOCSIS. Some technical hurdles yet are to be overcome.

For instance, self-interference from the transmit path into the receive path within one and the same transceiver (echo hereinafter) shall be properly canceled. Echo is typically removed using a so-called analog hybrid circuit. Hybrid circuits aim at increasing the coupling path loss from the transmitter's output to the receiver's input, e.g. by means of signal subtraction in the analog domain. Hybrid circuits can be further combined with digital echo cancellation techniques such as LMS filters, vectoring, etc.

Hybrid circuits and echo cancelers are typically required at both ends of the cable plant, that is to say at the network side (access node) and at the subscriber side (cable modem). Such hybrid circuits should be adapted to operate over a wide range of frequencies, and are thus expected to be complex and expensive. Yet, the subscriber equipment faces intensive cost pressure and has to be as cheap as possible.

SUMMARY OF THE INVENTION

It is an object of the present invention to provide an efficient and cheap solution at the subscriber side for full-duplex communication over a shared transmission medium.

In accordance with a first aspect of the invention, a communication device for communication over a shared transmission medium comprises a transmitter for transmitting communication signals through a transmitter output terminal, a receiver for receiving communication signals through a receiver input terminal, and a coupling unit for coupling the transmitter output terminal and the receiver input terminal to the shared transmission medium. The coupling unit comprises a first filter for passing communication signals from/to the shared transmission medium within a first communication frequency range, and a second filter for passing communication signals from/to the shared transmission medium within a second communication frequency range disjoint from the first communication frequency range. The coupling unit further comprises a configurable switch for connecting the transmitter output terminal to the first filter and the receiver input terminal to the second filter in a first switching state, or (exclusive) for connecting the transmitter output terminal to the second filter and the receiver input terminal to the first filter in a second switching state. The communication device further comprises a switching controller for selecting between the first or second switching state based on configuration information received from a remote access node coupled to the communication device via the shared transmission medium.

In one embodiment, the switching controller is further configured, during an initialization stage of the communication device, to select one of the first and second switching states as a default switching state for establishment of a basic communication channel between the access node and the communication device. The configuration information is conveyed over the basic communication channel.

In one embodiment, the basic communication channel is defined over pre-determined frequency carriers of the first and second communication frequency ranges.

In one embodiment, the first communication frequency range comprises one first low-frequency band and the second communication frequency range comprises one second high-frequency band disjoint and separated from the first low-frequency band by a guard band.

In one embodiment, the first and second filters are implemented as a diplexer.

In one embodiment, the shared transmission medium is a cable plant, and the communication device is a cable modem.

In accordance with another aspect of the invention, a method for assigning communication resources to a plurality of communication devices for communication over a shared transmission medium comprises assigning first frequency carriers in a first communication frequency range for downstream communication and second frequency carriers in a second communication frequency range disjoint from the first frequency range for upstream communication to a first part of the plurality of communication devices, and assigning the second frequency carriers for downstream communication and the first frequency carriers for upstream communication to a second remaining part of the plurality of communication devices.

In one embodiment, the method further comprises, if a first communication device and a second communication device out of the plurality of communication devices have been characterized as highly-interfering communication devices, assigning the first and second communication devices to the same part of communication devices.

In one embodiment, the method comprises assigning third pre-determined frequency carriers in the first and second communication frequency ranges for establishment of a basic communication channel with respective ones of the plurality of communication devices. Configuration information is conveyed over the basic communication channel for configuring respective ones of the plurality of communication devices as belonging to the first or second part of communication devices.

The present invention also relates to a communication controller for assigning communication resources to a plurality of communication devices as per the above method, to an access node comprising such a communication controller (e.g., a fiber coax unit), and to a communication system comprising an access node and communication devices as per the present invention (e.g., a hybrid fiber coax network).

The available communication spectrum is split into two parts: a low-frequency band and a high-frequency band, typically separated by a guard band to account for the roll-off of the filters. The fiber-coax unit keeps on operating in full-duplex mode, meaning the same carriers are used for both downstream (DS) and upstream (US) transmission simultaneously. Yet, one makes sure that the set of DS carriers and the set of US carriers assigned to any given cable modem are not located within the same frequency band, meaning that if the set of DS carriers assigned to a given cable modem is placed in the low-frequency band then the set of US carriers assigned to that cable modem is placed in the high-frequency band (or the other way around). The carriers that are used for DS (resp. US) transmission with that cable modem can thus be re-used for US (resp. DS) transmission with another cable modem. While the full spectrum can still be exploited in both directions simultaneously over the entire shared medium, each cable modem can easily separate the US signal from the DS signal in the frequency domain, e.g. by means of a diplexer, which is a cheap passive device that implements frequency division multiplexing and de-multiplexing over a wide frequency range.

As the cable modems are initially unaware of which frequency bands to use for which directions of communication, some switching circuitry and control logic are required to select and to connect to the right frequency bands for US transmission and DS reception.

The substitution at the subscriber side of the diplexer and extra switching circuit for the typical hybrid circuit and echo canceler allows to drastically simplify the design of the cable modem and to substantially decrease its cost. Moreover, this implementation provides an easy solution to cross-user interference (upstream of one modem leaking into the downstream of a nearby modem).

BRIEF DESCRIPTION OF THE DRAWINGS

The above and other objects and features of the invention will become more apparent and the invention itself will be best understood by referring to the following description of an embodiment taken in conjunction with the accompanying drawings wherein.

DETAILED DESCRIPTION OF THE INVENTION

Figure 1:
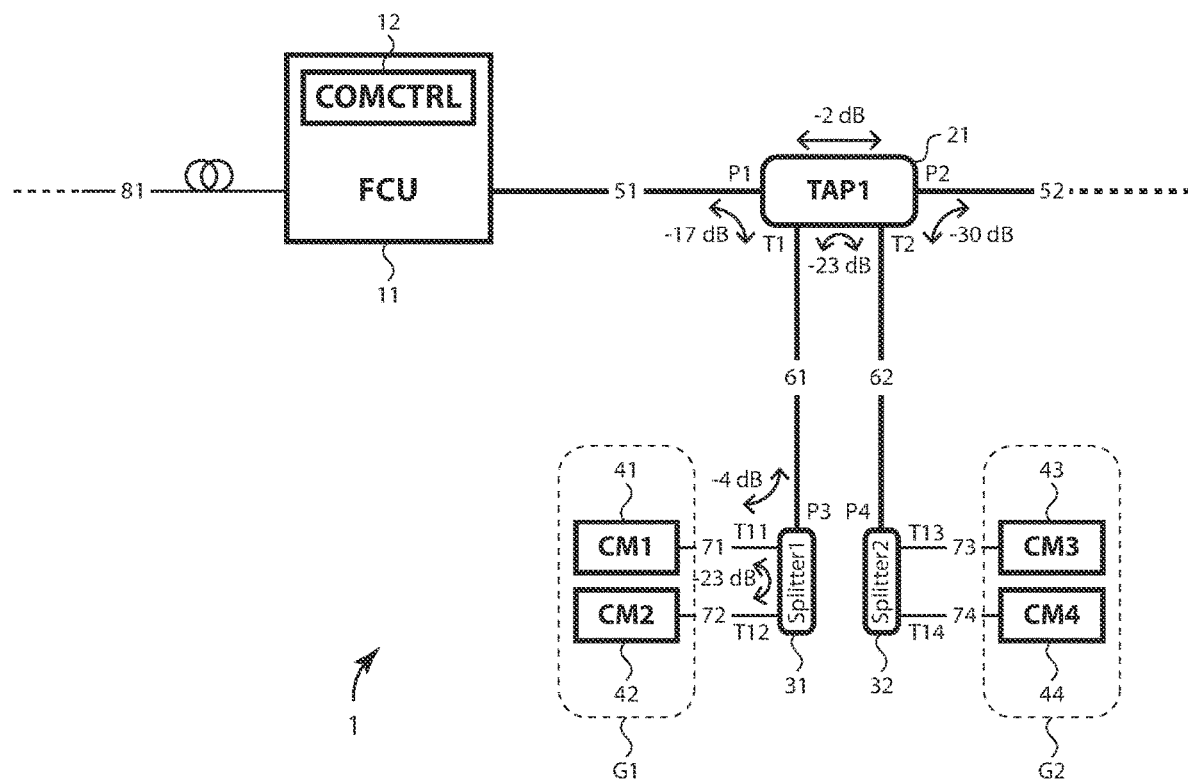
FIG. 1 represents a part of a hybrid fiber coax network.

There is seen in FIG. 1 part of a Hybrid Fiber Coax (HFC) communication system 1 comprising a Fiber Coax Unit (FCU) 11 coupled to Cable Modems (CM) 41 to 44 via a cable plant, and to an operator's network (not shown) via one or more optical links 81.

The cable plant comprises primary coaxial segments 51 and 52, secondary coaxial segments 61 and 62, and ternary coaxial segments 71 to 74. The primary coaxial segment 51 couples the FCU 11 to the input port P1 of a two-way tap 21 (or TAP1). The output port P2 of the tap 21 is coupled via the primary coaxial segment 52 to the input port of another two-way tap (not shown). The tap 21 further comprises two tap ports T1 and T2 for connection to CMs or further splitters. Presently, the tap port T1 of the tap 21 is coupled via the secondary coaxial segment 61 to the input port P3 of a splitter 31, the tap ports T11 and T12 of which are coupled via the ternary coaxial segments 71 and 72 to the CMs 41 (or CM1) and 42 (or CM2) respectively; the tap port 12 of the tap 21 is coupled via the secondary coaxial segment 62 to the input port P4 of a splitter 32, the tap ports T13 and T14 of which are coupled via the ternary coaxial segments 73 and 74 to the CMs 43 (or CM3) and 44 (or CM4) respectively.

The cable plant may comprise further taps, splitters and CMs, possibly inter-connected in a different way. The particular plant topology plotted in FIG. 1 is only one out of many, and only serves as an illustrative example for the forthcoming description.

The coupling losses induced by the tap 21 and the splitters 31 and 32 depend on their exact hardware architecture and implementation, and may vary from one coupler type to another, and further from one manufacturer to another. Yet, there are some generic coupling characteristics that are noteworthy.

The path loss of the bi-directional coupling path between the input port P1 and the output port P2 of the tap 21 typically ranges from 1 to 3 dB (2 dB assumed in FIG. 1). The path loss between the primary ports P1 and the respective tap ports T1 or T2 is higher, generally ranging from 8 to 27 dB depending on the distance to FCU 11 (17 dB assumed in FIG. 1). The path losses between the input port and the respective tap ports of the splitters 31 and 32 is typically about 4 dB for a two-way splitter (4 dB assumed in FIG. 1). The tap ports of the tap 21 and of the splitters 31 and 32 are isolated from each other by a path loss in the range of 20 to 25 dB (23 dB assumed in FIG. 1). Finally, the tap 21 further prevents the return upstream signal received at the output port P2 from coupling back into the tap ports. This path loss is typically about 30 dB (30 dB assumed in FIG. 1).

Communication over the coaxial plant is full-duplex and is defined over a common set of orthogonal carriers, meaning the same set of carriers is used for both downstream (from the FCU towards the CMs) and upstream (from the CMs towards the FCU) communications simultaneously. Thus, the aggregate capacity is doubled when compared to legacy techniques such as FDD deployed for DOCSIS or xDSL technologies, or Time Division Duplexing (TDD) as envisioned for future G.Fast deployments. As aforementioned, and even with full-duplex transmission, the users are still assigned distinct and non-overlapping sets of carriers.

The FCU 11 comprises a communication controller 12 (or COMCTRL) that assigns the available carriers to the respective CMs. A carrier is assigned to a particular user for a particular direction of communication. As will be set forth further in the description, the very same carrier is assigned to another user for the opposite direction of communication.

Full-duplex transmission is typically defined over a single spectrum band ranging from $f_{start}$ to $f_{end}$. The bandwidth $(f_{end}-f_{start})$ can for example be 1 GHz.

Figure 2A:
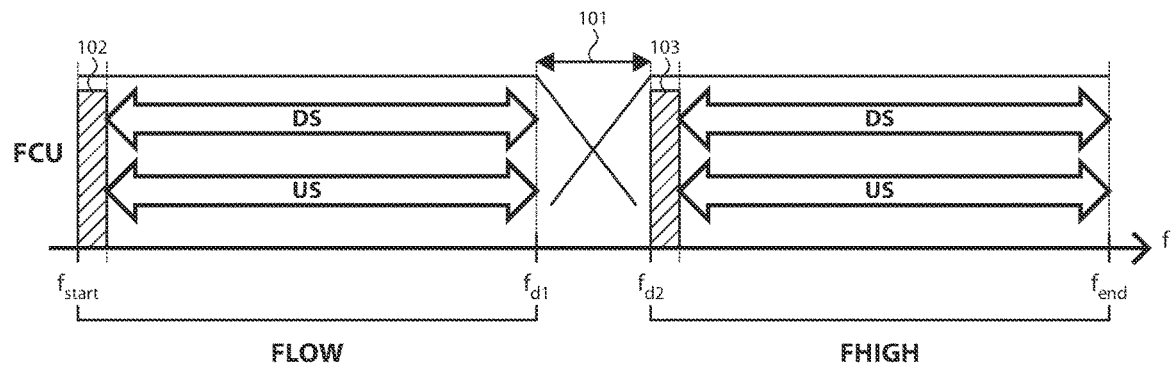
FIGS. 2A and 2B represent an exemplary resource allocation scheme as per the present invention at both the network and subscriber sides.
Figure 2B:
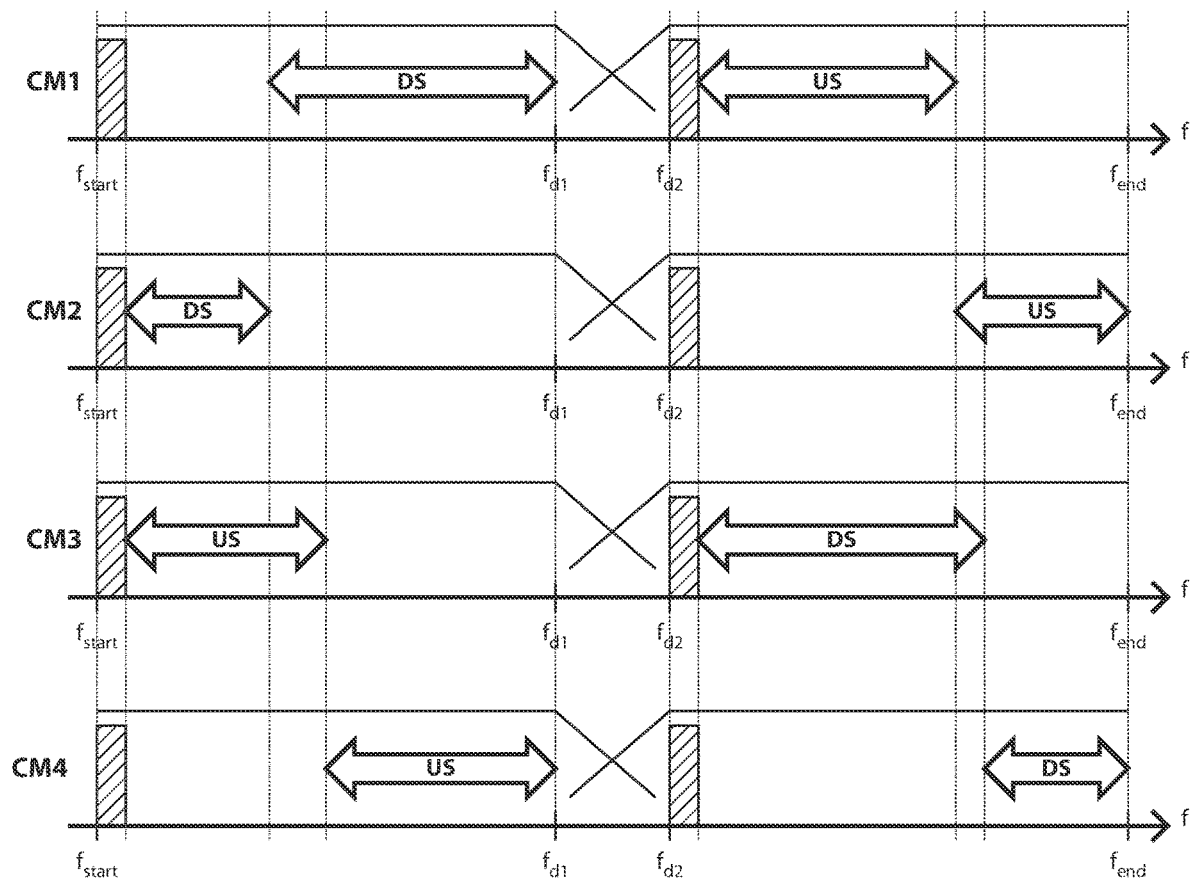

According to the present invention, and as depicted in FIG. 2A, this available spectrum is now split into two parts: a low-frequency band FLOW ranging from $f_{start}$ to $f_{d1}$, and a high-frequency band FHIGH ranging from $f_{d2}$ to $f_{end}$. Between $f_{d1}$ and $f_{d2}$ is a guard band 101 on account of the roll-off of the corresponding filters. Hence frequencies between $f_{d1}$ and $f_{d2}$ are not used as they are not passed through, which induces a modest data rate penalty (the guard band frequencies can still be used if one or more CMs in the network are full-duplex capable).

At the network side (FCU side), the full available spectrum is used in both directions simultaneously. Consequently, the FCU 11 accommodates a hybrid circuit, possibly augmented with an echo cancellation filter and/or a vector processor, to isolate the strong transmit signal from the weak receive signal.

Yet, at the subscriber side (CM side), the communication controller 12 guarantees that the upstream and downstream carriers assigned to each CM are not within the same frequency band FLOW or FHIGH.

The spectral occupation at the CM side is illustrated in FIG. 23, assuming the CMs 41 to 44 are connected to the cable plant. As one can see, each frequency band FLOW and FHIGH is used for both DS and US transmission, yet the DS and US carriers assigned to a given CM are located in different frequency bands, and can be easily isolated from each other by means of appropriate filters without the need for an expensive hybrid circuit.

For instance, each CM can use a diplexer and some extra switching circuitry and control logic.

A diplexer is a passive device that includes a high-pass filter coupled to a H-port, and a low-pass filter coupled to a L-port. The two ports are multiplexed onto a third port coupled to the transmission medium. In a first switching state, the receiver input is connected to the L-port (i.e., the DS carriers are located within the frequency band FLOW) while the transmitter output is connected to the H-port (i.e., the US carriers are located within the frequency band FHIGH). In a second switching state, the receiver input is connected to the H-port (i.e., the DS carriers are located within the frequency band FHIGH) while the transmitter output is connected to the L-port (i.e., the US carriers are located within the frequency band FLOW).

Each CM is thus able to have equal or asymmetric US and DS bands, with the full capacity of the frequency bands FLOW and FHIGH as upper limit. For example, if the capacities of the frequency bands FLOW and FHIGH are both 5 Gb/s, each CM has an upper limit of 5 Gb/s US and 5 Gb/s DS simultaneously, while the FCU can operate up to 10 Gb/s US and 10 Gb/s DS simultaneously (aggregated over all CMs).

The communication controller 12 communicates to each CM the respective sets of carriers to use for DS and US communication, taking into account their respective data rate requirements and grades of service. Each CM is then able to derive its switching state, that is to say to which ones of the H-port and L-port of the diplexer the transmitter output and receiver input shall be connected.

As initially the CMs are unable to know which communication scheme to use, some carriers 102 and 103 are reserved in the frequency bands FLOW and FHIGH for establishing a basic bi-directional communication channel. The location of those reserved carriers is preliminary known to both the FCU and the CMs. For instance, the frequency sub-band 102 can be reserved for basic US communication while the frequency sub-band 103 can be reserved for DS basic communication (or vice-versa). Although the frequency sub-bands have been plotted at the lower part of the frequency bands FLOW and FHIGH, they can be located at any fixed position within those bands.

The basic communication channel is used interalia for assigning a set of DS and US carriers to the respective CMs. Upon initialization, a given CM knows how to initially connect its transmitter's output and receiver input to the diplexer so as to establish this basic communication channel with the FCU (inc. some contention avoidance algorithm). Once basic configuration data have been received through the basic communication channel, the CM connects its transmitter output and receiver input to the diplexer port as per the configured DS and US carrier sets, and carries on with further initialization steps to establish a full bi-directional communication path over the so-assigned carriers. The basic communication channel is then released for initialization of another CM.

The communication controller 12 may further account for the mutual interference levels between the respective CMs in the carrier assignment process. Indeed, the US transmit signal from one CM leaks into the DS path of another CM if the CMs have limited isolation. For example, the tap-to-tap isolation is only 20-25 dB. This interfering signal will add power to the direct DS signal from the FCU as the two signals are uncorrelated, and thus can cause signal clipping in the analog front end and lower the relative power of the useful receive signal.

To mitigate this inter-CM interference at the receiver, the DS and US carriers of highly-interfering CMs are placed in the same frequency bands. For instance, the DS carriers of CMs 41 to 44, which have a rather low isolation between each other, are assigned to the frequency band FLOW, and their US carriers are assigned to the frequency band FHIGH. By so doing, the US signal of e.g. CM 42, which is located within the frequency band FHIGH, is filtered out by the analog front end of e.g. CM 41, which is only listening to the frequency band FLOW, and thus does not impair the reception of the direct DS signal of CM 41. Further CMs (not shown) connected to further taps (not shown) via the primary coaxial segment 52, and thus having a good isolation with the CMs 41 to 44 (on account of the 30 dB return path loss of the tap 21), would be assigned the frequency band FHIGH for DS communication and the frequency band FLOW for US communication in order to make the most efficient use of the available spectrum.

In addition, one may further apply some clever time division techniques to mitigate inter-CM interference, such as the one described in the European patent application entitled "Full-Duplex Communication over a Shared Transmission Medium" filed on Apr. 25, 2014 with application number 14305610.9 in the name of Alcatel-Lucent, and whose entire content is incorporated herein.

Figure 3:
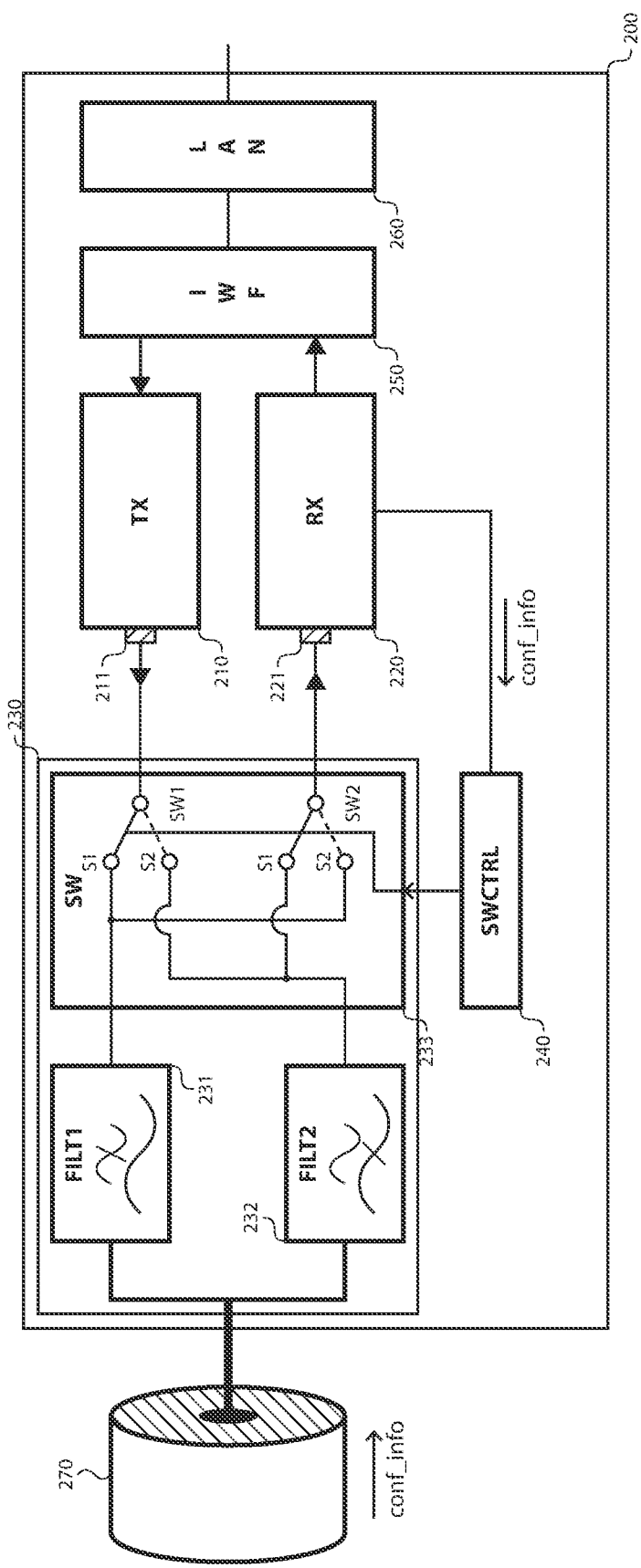
FIG. 3 represents a cable modem as per the present invention.

There is seen in FIG. 3 further details about a communication device 200 as per the invention.

The communication device 200 comprises:
- a transmitter 210 (or TX) for transmitting US signals through an output terminal 211;
- a receiver 220 (or RX) for receiving DS signals through an input terminal 221;
- a coupling unit 230 for coupling the transmitter output terminal 211 and the receiver input terminal 221 to a shared transmission medium 270;
- a switching controller 240 (or SWCTRL);
- an interworking function 250 (or IWF); and
- local communication logic 260 (or LAN).

The transmitter 210 and the receiver 220 are coupled to the interworking function 250 and to the coupling unit 230;

the switching controller is coupled to both the coupling unit 210 and the receiver 220. The interworking function 250 is further coupled to the local communication logic 260.

The coupling unit 230 comprises a first low-pass filter 231 (or FILT1) for passing signals present in the frequency band FLOW, a second high-pass filter 232 (or FILT2) for passing signals present in the frequency band FHIGH, and a switch 233 (or SW).

As depicted in FIG. 3, the switch 233 comprises two coordinated switching elements SW1 and SW2, and has two switching states further referred to as S1 and S2. The master terminals of the switching elements SW1 and SW2 are connected to the transmitter output terminal 211 and to the receiver input terminal 221 respectively. The two slave terminals of each one of the switching elements SW1 and SW2 are connected to the filters 231 and 232 respectively.

In the first switching state S1, the switching elements SW1 and SW2 are both in the up position, meaning the output terminal 211 of the transmitter 210 is coupled to the low-pass filter 231 while the input terminal 221 of the receiver 220 is coupled to the high-pass filter 232. In the second switching state S2, the switching elements SW1 and SW2 are both in the down position, meaning the output terminal 211 of the transmitter 210 is coupled to the high-pass filter 232, while the input, terminal 221 of the receiver 220 is coupled to the low-pass filter 231.

The switching controller 240 selects the right switching state to enforce based upon configuration information conf_info received from a remote FCU via the shared transmission medium 270 and the receiver 220.

The low-pass filter 231 and the high-pass filter 232 typically comprise passive lumped elements, such as resistors, capacitors or inductors, and can be of any order, usually of the third, fifth or seventh order. The higher the filter order, the more expensive and bulky the filters, yet the smaller the guard band 101 and thus the higher the aggregate throughput over the shared medium 270.

As any passive network, they are reciprocal networks, meaning that the transfer function of the filter does not change no matter at which ends of the filter you put the generator and the load impedance, provided the load impedance matches the generator's impedance, which is typically the case as the output impedance of the transmitter 210 and the input impedance of the receiver 220 are both expected to match the characteristic impedance of the transmission medium 270 for proper operation. For fully symmetric filters, that provision is even not required.

If the filters 231 and 232 accommodate some active components, such as transistors, then they are no longer reciprocal, and their two ports are instantiated as an input port to be coupled to a generator and an output port to be coupled to a load impedance. Consequently, some extra switching circuitry is needed to couple the filter input port to the transmitter output terminal 211 and the filter output terminal to the transmission medium 270 if that filter is used along the transmit path, or to couple the filter input terminal to the transmission medium 270 and the filter output terminal to the receiver input terminal 221 if that filter is used along the receive path.

The transmitter 210 and the receiver 220 typically comprises an analog part and a digital part.

The transmit analog part comprises a Digital-to-Analog Converter (DAC), and a line driver for amplifying the transmit signal and for driving the transmission medium. The receive analog part comprises a Low Noise Amplifier (LNA) for amplifying the receive signal with as little noise as possible, and an Analog-to-Digital Converter (ADC).

Some further analog components may be present along the transmit or receive analog path of the transceiver 200. For instance, the transceiver 200 may further include impedance-matching circuitry for adapting to the characteristic impedance of the transmission medium 270, or surge protection circuitry, or isolation circuitry. Often, all or part of these blocks form an integral part of the filter design (e.g., the windings of a transformer can be used as an inductor in the filter).

Still for instance, the transceiver 200 may further include an RF mixer to up/down-convert the signals to/from the frequency band FHIGH. Such an RF mixer would be inserted between the filter 232 and the switch 233.

The digital part is typically implemented by means of one or more Digital Signal Processors (DSP), and is configured to operate downstream and upstream communication channels for conveying user traffic over the coaxial medium.

The digital part is further configured to operate downstream and upstream control channels that are used to transport control traffic, such as diagnosis or management commands and responses. Control traffic is multiplexed with user traffic over the transmission medium.

The digital part is further configured to execute the necessary initialization steps, including the establishment of a basic bi-directional communication channel to fetch basic configuration data, and next, once the switching state has been enforced as per the DS and US carrier assignment, to carry on with further initialization steps for establishing a full bi-directional communication channel over the so-assigned DS and US carriers, such as channel analysis and training.

More specifically, the digital part is for encoding and modulating user and control data into digital data symbols, and for demodulating and decoding user and control data from digital data symbols.

The following transmit steps are typically performed in the digital part:
data encoding, such as data multiplexing, framing, scrambling, error correction encoding and interleaving;
signal modulation, comprising the steps of ordering the carriers according to a carrier ordering table, parsing the encoded bit stream according to the bit loadings of the ordered carriers, and mapping each chunk of bits onto an appropriate transmit constellation point (with respective carrier amplitude and phase), possibly with Trellis coding;
signal scaling;
Inverse Fast Fourier Transform (IFFT);
Cyclic Prefix (CP) insertion; and possibly
time-windowing.

The following receive steps are typically performed in the digital part:
CP removal, and possibly time-windowing;
Fast Fourier Transform (FFT);
Frequency EQualization (FEQ);
signal demodulation and detection, comprising the steps of applying to each and every equalized frequency sample an appropriate constellation grid, the pattern of which depends on the respective carrier bit loading, detecting the expected transmit constellation point and the corresponding transmit binary sequence encoded therewith, possibly with Trellis decoding, and reordering all the detected chunks of bits according to the carrier ordering table; and
data decoding, such as data deinterleaving, error correction, de-scrambling, frame delineation and demultiplexing.

Some of these transmit or receive steps can be omitted, or some additional steps can be present, depending on the exact digital communication technology being used.

The receiver 220 supplies decoded payload data to the interworking function 250 for further handling, and the other way around the interworking function 250 supplies payload data to the transmitter 210 for further encoding and transmission over the shared transmission medium.

The interworking function 250 interfaces the transmitter 210 and the receiver 220 with the local communication logic 260, and typically includes some rate adaptation and traffic dispatching/prioritization logic.

The local communication logic 260 is for handling and appropriately forwarding/routing local traffic from/to subscriber terminals over a wireless or wired Local Area Network (LAN).

Although the description has primarily focused on a communication scheme with two frequency bands, namely a low-frequency band FLOW and a high-frequency band FHIGH, one may have two or more frequency bands per direction of communication, meaning extra band-pass filters and extra switching circuitry within the coupling unit, and thus a higher cost and an increased board space for the CM. One may combine the signals from these filter altogether, or select the one or more filters over which the carriers have been actually configured for that particular CM. These additional bands permit more freedom in tailoring the DS/US peak data rates.

Also, the frequency bands FLOW and FHIGH were assumed fixed so far. Yet, once can envision a configurable split frequency and configurable filters. In this way, the FCU can adapt the communication resources to the exact traffic demand. The configured split frequency will be sent upon initialization through the basic communication channel, together with the configured sets of DS and US carriers.

Still also, the switching controller has been plotted as a separate unit, but could similarly form part of the transceiver unit of the CM.

Finally, the configuration information conf_info may alternatively comprise an explicit indication of the switching state that shall be enforced within the switch 233, or any information element from which the switching state of the switch 233 can be derived.

It is to be noticed that the term 'comprising' should not be interpreted as being restricted to the means listed thereafter. Thus, the scope of the expression 'a device comprising means A and B' should not be limited to devices consisting only of components A and B. It means that with respect to the present invention, the relevant components of the device are A and B.

It is to be further noticed that the term 'coupled' should not be interpreted as being restricted to direct connections only. Thus, the scope of the expression 'a device A coupled to a device B' should not be limited to devices or systems wherein an output of device A is directly connected to an input of device B, and/or vice-versa. It means that there exists a path between an output of A and an input of B, and/or vice-versa, which may be a path including other devices or means.

The description and drawings merely illustrate the principles of the invention. It will thus be appreciated that those skilled in the art will be able to devise various arrangements that, although not explicitly described or shown herein, embody the principles of the invention. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, a processor should not be construed to refer exclusively to hardware capable of executing software, and may implicitly include, without limitation, Digital Signal Processor (DSP) hardware, network processor, Application Specific Integrated Circuit (ASIC), Field Programmable Gate Array (FPGA), etc. other hardware, conventional and/or custom, such as Read Only Memory (ROM), Random Access Memory (RAM), non volatile storage, may also be included.

The invention claimed is:

1. A method for assigning communication resources to a plurality of communication devices for communication over a shared transmission medium, the method comprising:
   assigning first frequency carriers in a first communication frequency range for downstream communication and second frequency carriers in a second communication frequency range disjoint from the first frequency range for upstream communication to a first part of the plurality of communication devices, and assigning the second frequency carriers for downstream communication and the first frequency carriers for upstream communication to a second part of the plurality of communication devices; and
   in response to a first communication device and a second communication device out of the plurality of communication devices have been characterized as highly-interfering communication devices, assigning the first and second communication devices to the same one of the first part or the second part of the communication devices.

2. A method according to claim 1, wherein
   the method comprises assigning third pre-determined frequency carriers in the first and second communication frequency ranges for establishment of a basic communication channel with respective ones of the plurality of communication devices, and
   configuration information is conveyed over the basic communication channel for configuring respective ones of the plurality of communication devices as belonging to the first or second part of the communication devices.

3. A communication controller for assigning communication resources according claim 1 to a plurality of communication devices for communication over a shared transmission medium.

4. An access node comprising a communication controller according to claim 3.

* * * * *